Sept. 1, 1964 H. J. SHWISHA ETAL 3,146,532
EDUCATIONAL DEVICE
Filed Oct. 18, 1961 5 Sheets-Sheet 1
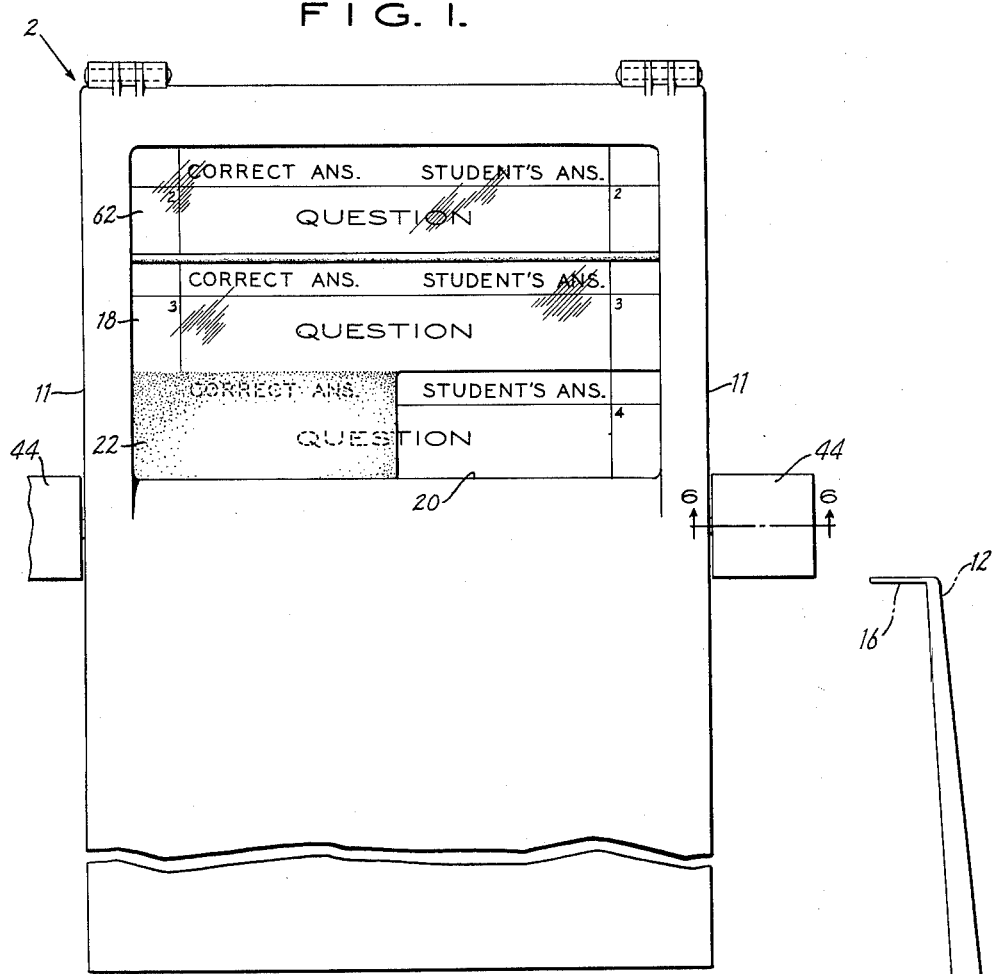
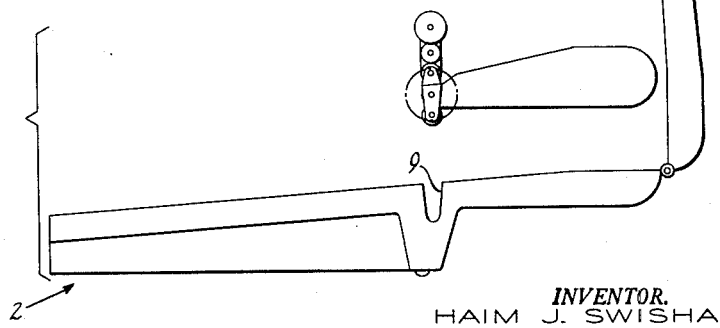
INVENTOR.
HAIM J. SWISHA
JULES NISENSON
BY
Morgan, Finnegan, Durham & Pine
ATTORNEYS

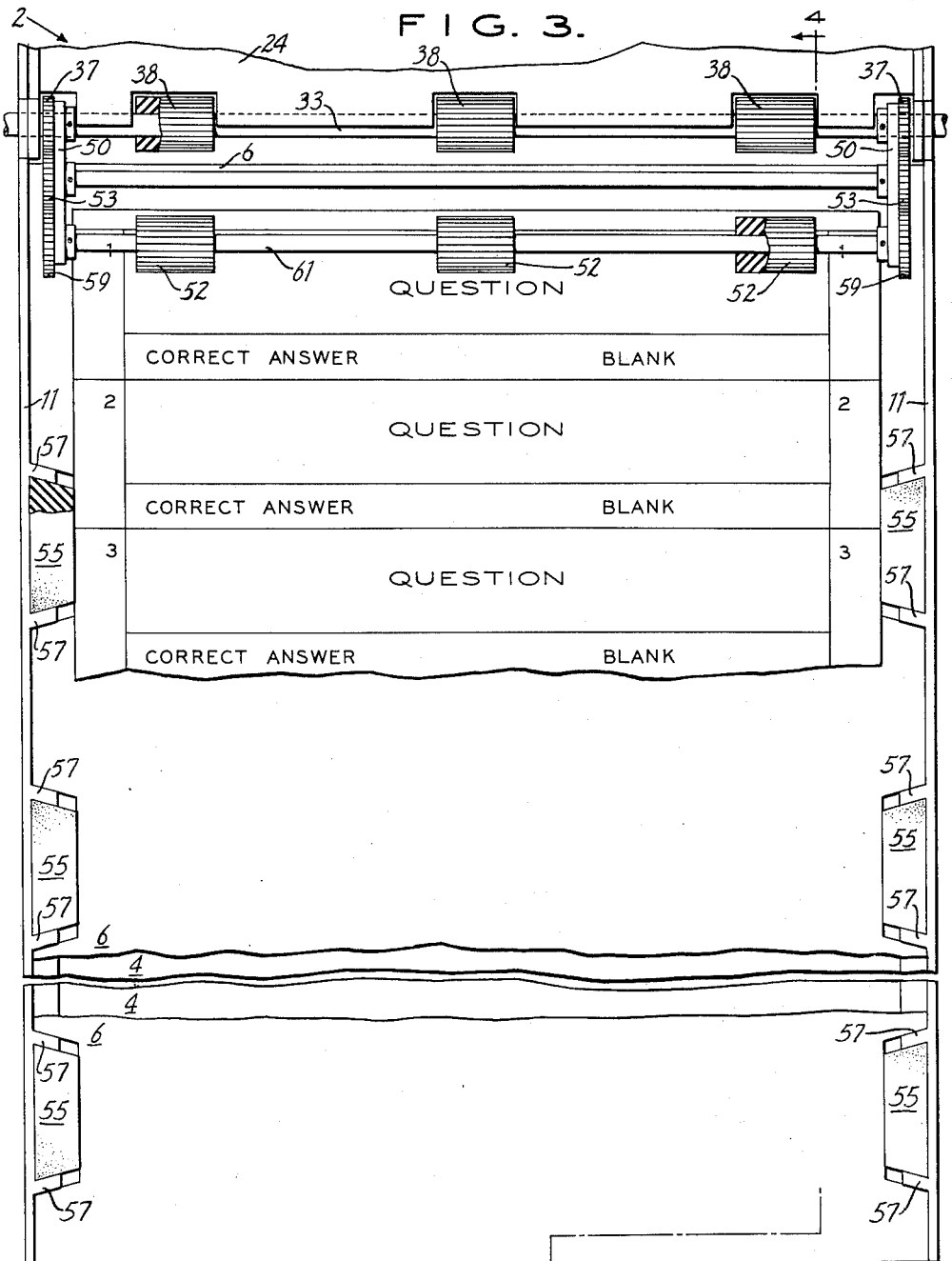

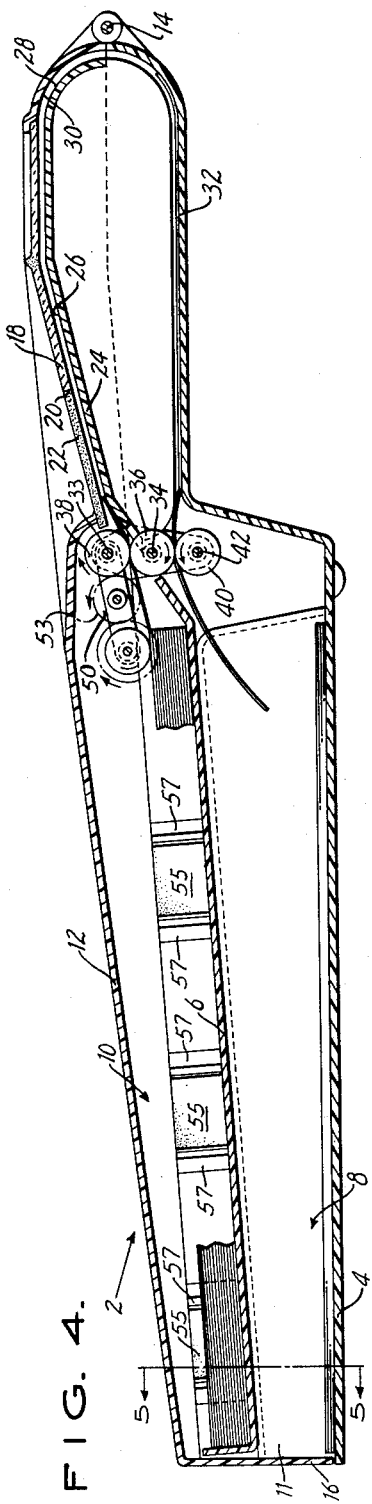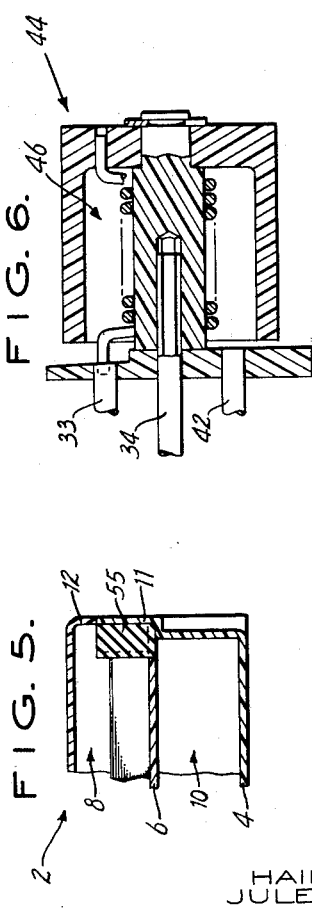

Sept. 1, 1964 H. J. SHWISHA ETAL 3,146,532
EDUCATIONAL DEVICE
Filed Oct. 18, 1961 5 Sheets-Sheet 4
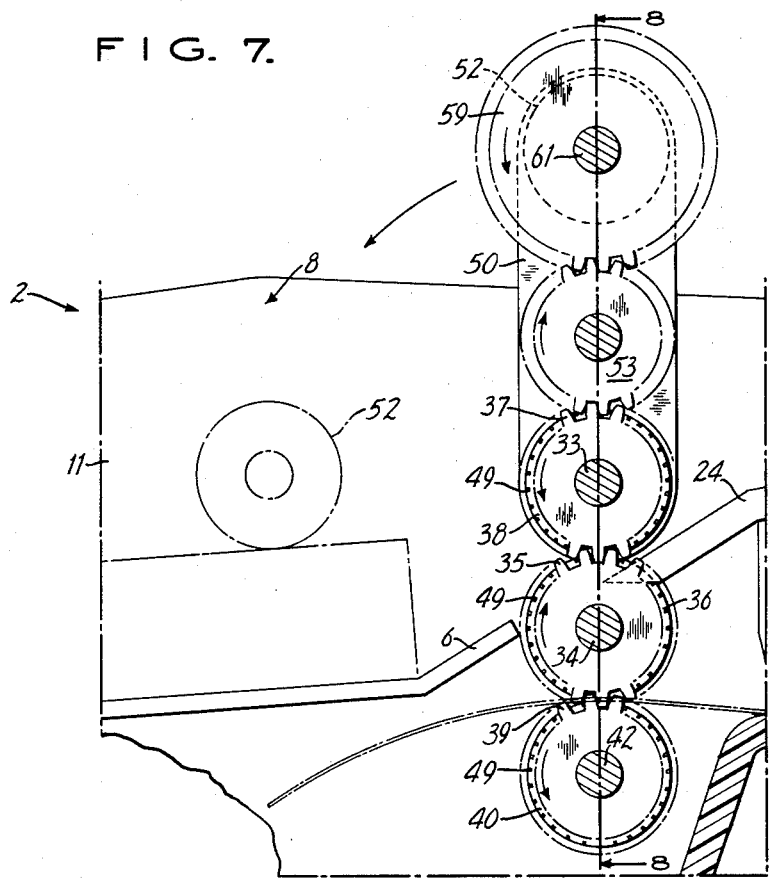
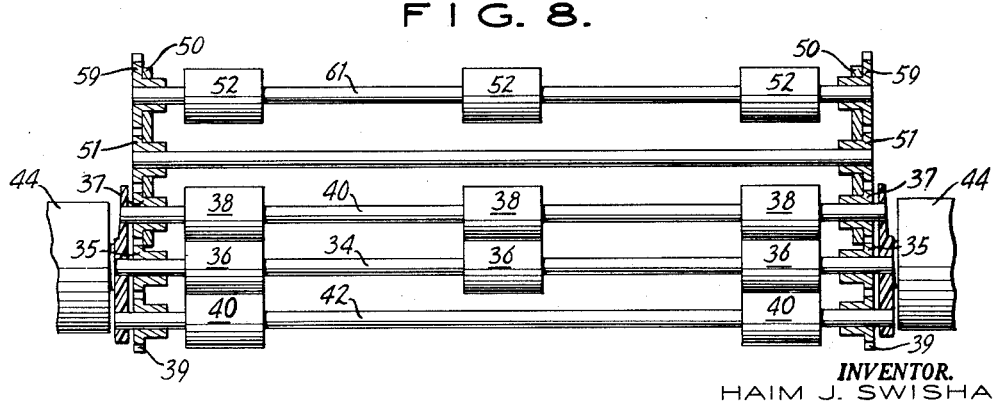
INVENTOR.
HAIM J. SWISHA
JULES NISENSON
BY
Morgan, Finnegan, Durham & Pine
ATTORNEYS

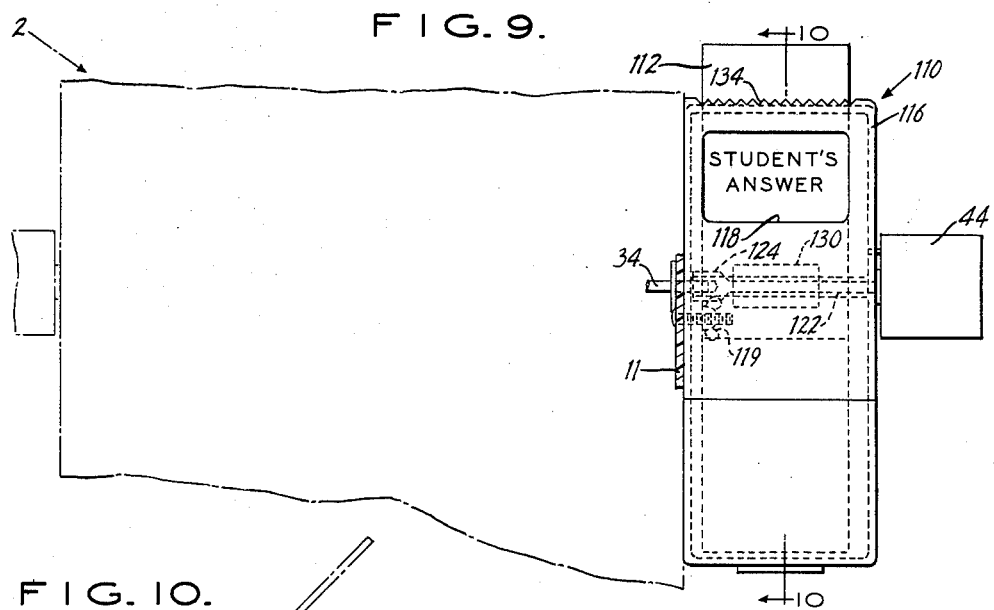
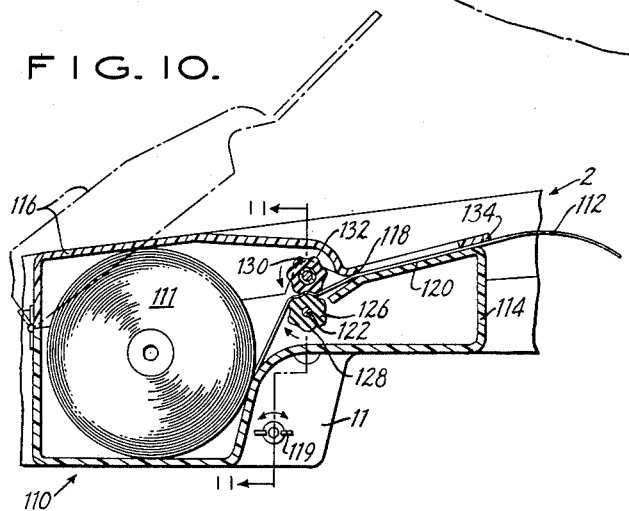
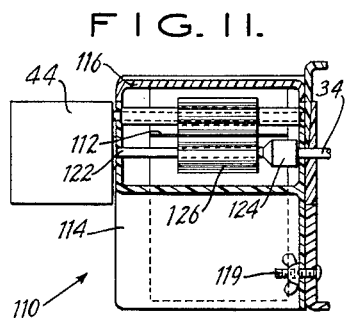

3,146,532
EDUCATIONAL DEVICE
Haim J. Shwisha, New York, and Jules Nisenson, Rye, N.Y., assignors, by mesne assignments, to Teaching Material Corporation, New York, N.Y., a corporation of New York
Filed Oct. 18, 1961, Ser. No. 145,827
5 Claims. (Cl. 35—9)

This invention relates to an educational device and, more particularly, is related to an educational testing device and method of educational testing.

In recent years there has been an ever-increasing number of students who wish to increase their education, and a decreasing number of teachers available to teach these students. Owing to the high student-teacher ratio, it has become increasingly important to utilize the skills of the professional teacher to best advantage, because the days when each student had his own teacher have long departed. Accordingly, methods and means have long been sought whereby the teacher's time is used most effectively and wherein the student can study and learn by himself, without the need of a teacher standing by at all times.

Concomitantly, home study has been, since the end of World War II, increasingly popular for persons who, in addition to being full time employees, are also part time students. An effective teaching system and device for teaching students, while at home and/or away from their teacher or instructor, has long been sought.

Many devices have been suggested in the past for solving the problems suggested above. The most commonly suggested solution is one wherein the student is given a book having a series of pages therein with questions thereon. The student reads the questions and prepares his answers adjacent the questions. In another form of this device, the answers are written on a separate sheet contained within the book wherein the answers are coded with respect to the questions.

One problem which has arisen with education devices of the first type is that the answer sheets are generally required to be given to the teacher who can then compare the questions with the answers. This system has the obvious disadvantage that the valuable time of the teacher is used to correct the student's answers. Also, where the teacher and student are separated by great distances, as in a home study course, there is a long lapse between the time the student prepares the answers and the time the students learns the correct answers. Although this system is reasonably effective as a testing procedure, it is not satisfactory as an educational system, because the student does not immediately learn the correct answer, and by the time he does learn it, he may have lost interest in the subject matter.

In view of the fact that many leading educators recommend the use of the question-answer system as an education tool, a suggested solution is to provide the student with a list of the answers to the questions posed. This solution has several disadvantages. The most obvious disadvantage is that even the most conscientious student will be tempted to look at the answers before preparing his own answers. The less conscientious, and more grade conscious student, will not only be tempted to review the answers before answering, but will also be tempted to change his written answers if they vary with the correct answers.

The present invention is directed to an educational system and device for practicing the same. The present invention is particularly adapted to the question-answer method of teaching.

The present invention employs a plurality of sheets of paper wherein each sheet has thereon a series of questions with the correct answers spaced below each question. The correct answer may occupy as much as one half the sheet width while the other half of the paper is blank and is for the purpose of permitting the student to place his answer directly adjacent the correct answer.

In accordance with this invention, the question sheet is positioned so that when the question is visible, the corresponding answer is invisible, that is, not exposed to view, and a blank portion of the sheet is adjacent the unexposed answer, so that the student can write his answer adjacent the unexposed correct answer.

After the student has prepared his answer, the question sheet is advanced so that the correct answer and the student's answer both become visible so that the student's answer and the correct answer can be compared.

In accordance with this invention, means are provided for storing a supply of question sheets and for storing the sheets after the questions have been answered. As embodied herein, this means comprises a stationary frame having a supply chamber and a storage chamber wherein each compartment has a depth sufficient to hold a large number of sheets.

In accordance with this invention, means are provided for permitting the student to observe and answer a question without seeing the correct answer. As embodied herein, this means comprises a cover element which cooperates with a writing platform wherein the cover element includes a transparent section where the question is visible, an opaque portion which maintains the correct answer out-of-sight and a cut-away portion which permits the student to write his answer adjacent the hidden correct answer. Further means are provided to permit a student to review the question after the correct answer and the student's answer become visible by movement to the transparent section. This enables a student to determine whether or not he read the question correctly in the event his answer differs from the given answer.

In accordance with this invention, means are provided for feeding the question sheets from the supply chamber and for directing them into answering position, and thence to the storage chamber. As embodied herein, this means comprises a plurality of rollers which cooperate with guiding means to feed the sheet over the writing platform and under the cover element so that the cover and platform can guide the sheets to a plurality of rollers which feed the sheets into a storage chamber.

As a safety feature, the feeding means is constructed and arranged so that the sheet can move only towards the storage chamber and cannot be retracted. Spring clutch drive means between the feed shaft and the actuating knobs effect one-way rotation of the feed shaft to move the sheets in a forward direction only. Thus, once the answer to a question is visible, the student cannot retract the sheet so that his answer could be changed.

It is essential to efficient and effective operation of a teaching device of the type described, that one sheet and only one sheet at a time be taken from the supply compartment and directed to the feeding rollers. This function is accomplished in the present invention by providing a floating pickup roller which is operatively connected to the feeding rollers so that when the feeding rollers are operated, one sheet at a time will be directed to the feeding rollers, regardless of the height of the sheets in the supply chamber. The pickup roller is aided in its function by friction creating means; such as, rubber pads in the supply chamber for gripping sheets before engagement by the pickup roller and thereby preventing more than one sheet from being fed at one time.

To simplify construction, the writing platform and actuating mechanisms are unitized for separate fabrication and subsequent insertion as a unit into the frame.

In a modification of the present invention, means is provided for answering the question on a separate, continuous roll, whereby the question programs can be re-used by a number of students. According to this embodiment, the means housing the supply of paper may be conveniently attached to the means housing the program of questions, whereby drive means may feed the questions and the answer sheet in timed relation to each other, permitting the student to view the question and to provide blank paper for the answer. In this way, the program of questions may be used by a student, yet be unmarked by him, thus permitting the same program to be re-used and distributed, for example, to other students, while at the same time providing with a convenient supply of paper upon which the answers may be written, and then severed from the paper supply and turned over to the teacher for grading.

With the foregoing in mind, it is an object of this invention to provide an improved teaching system.

A further object of this invention is to provide an improved educational testing device.

Another object of this invention is to provide an improved educational device wherein question containing sheets are presented to a student so that the student can answer the question adjacent the correct answer, wherein the correct answer remains hidden until after the sheet is advanced further.

A further object of this invention is to provide an improved educational test device which feeds a sheet from a supply chamber and to a position wherein questions on the sheet can be answered and which then directs and feeds the sheet to a storage chamber.

Another object of this invention is to provide an improved educational testing device wherein a single sheet is removed from a supply chamber and directed through a path and to a storage chamber wherein the sheet cannot be retracted during its path of movement.

Another object of this invention is to provide a teaching device including a frame, writing platform and feed means for feeding sheets in said frame one at a time over the writing platform wherein said writing platform and feed means are constructed as a unit and maintained integrally in said frame.

It is an object of a modified form of the present invention to provide means for feeding separate blank student answering material in timed relationship to the feed of said question and correct answer sheets whereby the question and correct answer can be freely re-used.

Additional objects and advantages of the invention will be set forth in part in the description which follows, and in part will be obvious from the description, or may be learned by practice of the invention, the objects and advantages being realized and attained by means of the instrumentalities and combinations particularly pointed out in the appended claims.

Briefly described, the present invention includes a frame having a supply and storage compartment, wherein means mounted in the frame pick up and direct a sheet from the supply compartment and to a point where individual questions on the sheet can be consecutively answered, the answers consecutively compared with the correct answer and the sheet advanced and directed to a storage chamber.

The invention consists in the novel parts, constructions, arrangements, combinations and improvements shown and described.

The accompanying drawings, which are incorporated in and constitute a part of this specification, illustrate several embodiments of this invention and, together with the description, serve to explain the principles of the invention.

In the drawings:

FIG. 1 is plan view of a preferred embodiment of the present invention.

FIG. 2 is a side elevation of the device with the lid shown in open position.

FIG. 3 is a fragmentary plan view of a preferred embodiment of the present invention with the lid removed and certain portions broken away.

FIG. 4 is a sectional view taken along line 4—4, FIG. 3.

FIG. 5 is a sectional view taken along line 5—5, FIG. 4.

FIG. 6 is an enlarged sectional view of the actuating knob and associated mechanism taken along line 6—6, FIG. 1.

FIG. 7 is an enlarged sectional view taken along line 7—7, FIG. 3.

FIG. 8 is an enlarged sectional view taken along line 8—8, FIG. 7.

FIG. 9 is a plan view of another embodiment of the present invention illustrating separate means for supplying a continuous sheet upon which answers may be written, associated with the preferred embodiment of the invention of FIG. 1, shown in phantom.

FIG. 10 is a sectional view taken along line 10—10, FIG. 9.

FIG. 11 is a sectional view taken along line 11—11, FIG. 10.

It will be understood that the foregoing general description and the following detailed description are exemplary and explanatory and not intended as restricting the scope of the invention.

The present invention is particularly adapted to be used with a plurality of sheets, preferably made of paper, one of which is illustrated in FIGURE 3. As can be seen in that figure, the left-hand portion of the sheet has a series of questions and answers consecutively arranged on the sheet, while the right-hand portion of the sheet is left blank to provide a space for the student's answers.

In accordance with this invention, means are provided for storing unanswered and answered questions and for supporting the driving mechanism. This means, as embodied herein, comprises a substantially rectangular frame 2 having a bottom plate 4 and an inclined intermediate plate 6 forming a storage compartment 8 and a supply compartment 10. The frame also includes upstanding sides 11 which cooperate with the cover element, as will appear more fully hereinafter. The supply compartment is adapted to hold a plurality of sheets, such as those described above with reference to FIGURE 1. The storage compartment is adapted to hold and store these sheets after the questions have been answered and fed into the storage compartment 8 by means hereinafter described.

In accordance with this invention means are provided for permitting observation of the questions and for permitting writing the answers to the questions adjacent the correct answers which remain hidden during the answering step. This means, as embodied herein, comprises a cover element 12 which, as shown in the drawings, is pivotally attached to the frame by a convenient means, such as hinges 14.

In FIGURE 2, the cover element is shown in open position whereas, as viewed in FIG. 4, the cover element is in its closed position.

The cover 12 cooperates with a depending portion 16 which serves to cover the supply chamber 8 and the storage chamber 10 when the cover is in its closed position. The cover element includes a transparent section 18, a cut-away section 20 and an opaque section 22 for purposes and reasons appearing hereinafter. In order that the student can write his answer adjacent the correct answer, a writing platform 24 is mounted within the frame in any convenient fashion. The writing platform 24 includes a writing and guiding surface 26 and a curved guiding surface 28. It is apparent that the writing surface is located directly underneath the cut-away portion 20. The cover element includes a curved guiding surface 30 which cooperates with the curved guiding surface 28 on the platform and the spaced transverse guiding elements 32 on the frame for guiding the sheets to the storage chamber 8.

In accordance with this invention means are provided for feeding the sheets from the supply chamber and directing them to the storage compartment. As embodied herein, this means comprises a driving shaft 34 mounted in sides 11 having a plurality of driving rollers 36 attached thereto. The plurality of second feeding rollers 38 are mounted on a feed shaft 33 which extends between the sides 11 and cooperates with driving rollers 36 for feeding a sheet therebetween. A plurality of return rollers 40 are mounted on a return shaft 42 between sides 11. The return rollers 40 cooperate with the driving rollers 36 to return the sheets to the storage compartment.

In accordance with the invention, means are provided for turning the driving shaft in one direction. As embodied, this means comprises a handle or hub 44 which is attached to the driving shaft 34 through a conventional one-way spring latch 46. The clutch 46 is provided so that when handle 44 is rotated in the counterclockwise direction the handle 44 is disengaged from the driving shaft 34 and the driving shaft 34 does not move (see FIG. 6). Thus, clutch 46 ensures rotation of shaft 34 in only one direction; i.e., clockwise.

In order to insure synchronous movement of the driving rollers 36, the feeding rollers 38 and the return rollers 40 have a geared connection. Thus, drive shaft 34 has at each end a drive gear 35 which engages the feeding gears 37 at each end of feed shaft 33 and the return gears 39 at each end of the return shaft 42.

To simplify construction and decrease assembly time, platform 24 and shafts 33, 34, 42 and rollers 36, 38, 40 are formed as a unit 35 as shown in FIG. 2 and inserted as a unit in slot 9 formed in sides 11. If desired, a locking element (not shown) may be provided to firmly maintain shaft 34 and the other unitized elements in position in frame 2.

Slippage is avoided between the drive, feed and return rollers by providing these rollers with rubber surfaces having transverse corrugations 49 thereon.

In accordance with this invention means are provided for removing one sheet at a time from the supply chamber for directing it to the feeding rolls. This means, as embodied herein, comprises floating means including a pair of levers 50 which are rotatably mounted on the drive shaft. Idler gears 53 are mounted on the levers 50 and are driven by the feeding gears 37. The idler gears 53 drive the pick-up gears 59 on pick-up shaft 61 mounted between levers 50. The pick-up rolls 52 are mounted on the pick-up shaft 61 and are driven upon rotation of the handle 44.

The floating means described above has been found to be particularly desirable, because it insures that one sheet at a time is directed between the driving rolls and the feeding rolls regardless of the number of sheets in the supply chamber of the height of the same. To aid the pick-up rolls in removing only one sheet at a time from the supply chamber, the supply chamber is provided with friction means in the form of a plurality of rubber blocks 55 mounted in retainers 57 on the sides of the supply chamber.

The operation of the device is as follows. The cover 12 is raised to its position shown in FIG. 2 and the supply chamber 10 is loaded with a plurality of sheets of the type shown in FIG. 3. The cover is then closed and a student turns the handle and pick-up rolls 52 feed one sheet between feed rolls 38 and drive rolls 36 until a question appears under the transparent section 18 of the cover. The student then writes his answer on the paper which is accessible through cut-away portion 20 in the cover. At this time, the answer is under the opaque portion 22 of the cover 12. The student, after answering the question, turns the handle 44 until the correct answer and his answer appear under the transparent portion 18 of the cover. He can then compare the two but cannot retract the sheet to vary his answer. After comparing, the above steps are repeated and the sheet is guided in the space between the cover 12, writing platform 24 and frame and directed between drive rolls 38 and return rolls 38 and return rolls 40 which direct the sheet to the storage compartment 8.

On occasion, a student wishes to review the question upon being apprised of the correct answer. To provide for review of the question, a second transparent section 62 is formed in the cover. An opaque step or raised section 64 separates transparent sections 18 and 62. Thus, the question, upon actuation of handle 44 to move the correct answer and the student's answer into viewing section 18, is moved into section 62 where it may be reviewed by the student.

In the embodiment of the invention illustrated in FIGS. 9-11, the student's answers are placed on a continuous paper web 112 mounted in a separate housing 110. Housing 110 includes a body section 114 and a hinged cover 116.

Cover 116 includes an open section 118. Cooperating with open section 118 is an inclined writing surface 120 preferably formed integrally with body section 114 to define the area for the student's answer.

Means is provided for feeding web 112 along writing surface 120. This means includes a driving shaft 122 removably coupled to drive shaft 34. Preferably the ends of shaft 34 are formed with a hexagonal cross section. Shaft 122 is, in turn, formed with a socket section 124 adapted to fit onto the end of shaft 34.

Fixed to shaft 122 is a resilient feed roller 126 having longitudinal teeth or ridges 128. Coacting with roller 126 is a second feed roller 130 having peripheral teeth 132 intermeshing with teeth 128.

Web 112 is disposed between rollers 126 and 128 as shown in FIG. 10. Rotation of drive shaft 122 rotates its associated roller 126, which in driving intermeshed engagement with roller 128 effects rotation thereof also. Web 112 disposed between and frictionally engaged by rollers 126 and 128 is thus advanced along writing surface 120.

When it is desired to have student answers placed on a separate sheet, handle 44 is removed from the preferably hexagonal end of shaft 34 and housing 110 secured as by a wing bolt 119 to one of the sides 11. Socket section 124 of shaft 122 is fitted onto the end of shaft 34 as shown in FIG. 11 and handle 44 and clutch 46 are then positioned on the exposed end of shaft 122.

With cover 116 opened, a supply roll 111 of paper web 112 is located in housing 110 and the leading end of web 112 threaded between feed rolls 126 and 128 and disposed onto writing surface 120. Cover 116 is then pivoted to closed position shown in full lines in FIG. 10 with the leading end of web 112 disposed on writing surface 120 beneath open section 118.

Web 112 is therefore disposed to receive the first student answer. After the first question has been answered handle 44 is rotated, as in the preferred embodiment, to reveal seriatim the correct answer and the subsequent questions and answers.

In this embodiment, the distal end of cover 116 includes a serrated or toothed edge 134. Edge 134 facilitates removal or tearing off of the portion of web 112 already utilized by a student. Thus, a teacher, after each question or series of questions, can readily collect the students' answers.

Thus, with the student's answers placed on a separate sheet, the question sheets can be readily re-used.

The invention in its broader aspects is not limited to the specific mechanisms shown and described, but departures may be made therefrom, within the scope of the accompanying claims, without departing from the principles of the invention and without sacrificing its chief advantages.

What is claimed is:

1. A teaching device comprising a frame, said frame including a supply compartment for holding a stack of individual sheets, each sheet having portions thereof bearing (1) a question, (2) the correct answer to the question, and (3) a blank space for receiving a written answer to the question, and a storage compartment beneath said supply compartment, a cover member hinged to said frame, sheet supporting means forwardly of said compartments and beneath a forward portion of said cover member; said cover member having an opaque portion, a cutout portion located over said sheet supporting means, and a transparent portion; sheet feeding means on said frame comprising a pair of feed rollers for advancing the topmost sheet of the stack of sheets in said supply compartment over said sheet supporting means to a position wherein the question bearing portion thereof is beneath the transparent portion of said cover member, the correct answer bearing portion thereof is beneath the opaque portion of said cover member and the blank portion thereof is beneath the cutout portion of said cover member to receive a written answer thereon to the question, said feed rollers being operative to further advance said sheet to another position wherein both the correct answer and written answer bearing portions thereof are visible through the transparent portion of said cover member, guide means on said sheet supporting means for guiding the advanced sheet toward said storage compartment, said sheet feeding means including a third roller cooperative with one of said pair of feed rollers for passing said advanced sheet to said storage compartment, and a fourth roller in contact with the topmost sheet of said stack of sheets in said supply compartment for picking up said topmost sheet and passing said sheet to said pair of feed rollers, and means interconnecting said third and fourth rollers with said pair of rollers whereby rotation of said third and fourth rollers is synchronized with the rotation of said pair of rollers.

2. A teaching device as in claim 1 and further including lever means for carrying said fourth roller in floating relation to said stack of sheets, said lever means being pivotally mounted on said sheet feeding means.

3. A teaching device as in claim 1 wherein said sheet supporting means and said sheet feeding means are in a single assembly and means on said frame for mounting said assembly.

4. A teaching device comprising a frame including at one end a supply compartment for a stack of sheets, each sheet having question, correct answer and blank portions, and a storage compartment beneath said supply compartment, a cover pivotally attached to said frame at the other end, said cover having an opaque section, a cutout section and a transparent section, a writing platform mounted on said frame forwardly of said compartments and beneath the cutout section of said cover, a roller mechanism on said frame between the forward edge of said supply compartment and the rear edge of said platform, said roller mechanism including a pair of rollers for feeding a sheet from said stack of sheets in said supply compartment over said platform to a position locating the correct answer beneath the opaque section of the cover and the blank portion beneath the cutout section of said cover and the question beneath the transparent section of the cover, guide means on said frame operative to reverse the direction of said fed sheet and to direct said sheet toward said storage compartment, a third roller coacting with one of said pair of rollers for advancing said sheet into said storage compartment, and a fourth roller for engaging the topmost of said stack of sheets and means on said frame for mounting said fourth roller in floating relation to said stack of sheets.

5. A teaching device as in claim 4 and further including gear means for synchronizing the rotation of said pair of rollers, said third roller and said fourth roller.

References Cited in the file of this patent

UNITED STATES PATENTS

| | | |
|---|---|---|
| 1,281,359 | Harrold | Oct. 15, 1918 |
| 1,291,608 | Newsom | Jan. 14, 1919 |
| 1,302,719 | Schaff | May 6, 1919 |
| 1,919,238 | McCarthy | July 25, 1933 |
| 2,169,266 | Matter | Aug. 15, 1939 |
| 2,293,433 | Gautier | Aug. 18, 1942 |
| 2,355,299 | Johnson | Aug. 8, 1944 |
| 2,480,767 | Pratt | Aug. 30, 1949 |
| 2,808,260 | Runzi | Oct. 1, 1957 |
| 2,876,006 | Benham | Mar. 3, 1959 |
| 2,987,828 | Skinner | June 13, 1961 |
| 3,056,215 | Skinner | Oct. 2, 1962 |
| 3,105,307 | Cornell | Oct. 1, 1963 |
| 3,106,026 | Jackson | Oct. 8, 1963 |